United States Patent
Chien et al.

(10) Patent No.: US 10,165,611 B2
(45) Date of Patent: Dec. 25, 2018

(54) BLUETOOTH PAIRING SYSTEM AND OPERATING METHOD THEREOF

(71) Applicant: Primax Electronics Ltd., Taipei (TW)

(72) Inventors: Chih-Feng Chien, Taipei (TW); Chen-Ming Chang, Taipei (TW); Chia-Shyang Hsu, Taipei (TW); Wen-Shih Lee, Taipei (TW)

(73) Assignee: Primax Electronics Ltd., Taipei (TW)

( * ) Notice: Subject to any disclaimer, the term of this patent is extended or adjusted under 35 U.S.C. 154(b) by 19 days.

(21) Appl. No.: 15/587,413

(22) Filed: May 5, 2017

(65) Prior Publication Data

US 2018/0206276 A1 Jul. 19, 2018

(30) Foreign Application Priority Data

Jan. 13, 2017 (TW) .............................. 106101221 A

(51) Int. Cl.
*H04W 4/80* (2018.01)
*H04W 76/14* (2018.01)
*H04W 8/00* (2009.01)
*G06F 13/42* (2006.01)
*G06F 13/38* (2006.01)

(52) U.S. Cl.
CPC .......... *H04W 76/14* (2018.02); *G06F 13/385* (2013.01); *G06F 13/4282* (2013.01); *H04W 4/80* (2018.02); *H04W 8/005* (2013.01)

(58) Field of Classification Search
CPC ................ H04W 4/008; H04L 63/0876; G06F 2213/0042
See application file for complete search history.

(56) References Cited

U.S. PATENT DOCUMENTS

| 7,865,640 B1* | 1/2011 | Lewis ................. G06F 13/4068 710/305 |
| 8,825,873 B2* | 9/2014 | Kumar .................... H04L 67/16 455/41.2 |
| 9,009,373 B2* | 4/2015 | Li ........................... G06F 3/162 710/63 |
| 9,032,195 B2* | 5/2015 | Kanamori .............. G01C 21/26 713/1 |
| 9,369,826 B2* | 6/2016 | Akama ................. H04W 4/008 |
| 9,635,499 B2* | 4/2017 | Ko ......................... H04W 76/14 |
| 2004/0162804 A1* | 8/2004 | Strittmatter ............. H04W 4/00 |

(Continued)

*Primary Examiner* — Cindy Trandai
(74) *Attorney, Agent, or Firm* — Winston Hsu

(57) ABSTRACT

A Bluetooth pairing system includes an external device and a host device. The external device includes a Bluetooth module, a first transmission interface and a USB controller. When the external device is connected with the host device, a standard handshaking message complying with a USB communication protocol is issued from the processor to the external device. After the standard handshaking message is received by the USB controller of the external device, a device descriptor of the external device is transmitted from the USB controller to the host device. The device descriptor contains a vendor identification code, a product identification code, a product string and a product type of the external device and a target communication address of the Bluetooth module. The host device analyzes the device descriptor to acquire the target communication address of the Bluetooth module.

9 Claims, 3 Drawing Sheets

(56) References Cited

U.S. PATENT DOCUMENTS

| | | | | | |
|---|---|---|---|---|---|
| 2004/0230790 | A1* | 11/2004 | Zhang | G06F 9/4401 | 713/2 |
| 2005/0070227 | A1* | 3/2005 | Shen | H04B 1/44 | 455/41.3 |
| 2005/0088980 | A1* | 4/2005 | Olkkonen | H04W 48/16 | 370/255 |
| 2006/0068760 | A1* | 3/2006 | Hameed | H04L 63/061 | 455/412.1 |
| 2006/0094402 | A1* | 5/2006 | Kim | H04M 1/7253 | 455/411 |
| 2008/0062939 | A1* | 3/2008 | Horn | H04W 74/06 | 370/338 |
| 2008/0182518 | A1* | 7/2008 | Lo | G06F 1/1632 | 455/41.3 |
| 2009/0089580 | A1* | 4/2009 | Sugikawa | H04L 61/301 | 713/168 |
| 2009/0222659 | A1* | 9/2009 | Miyabayashi | H04L 63/0823 | 713/156 |
| 2010/0004020 | A1* | 1/2010 | Hyun | H04M 1/72544 | 455/552.1 |
| 2010/0205327 | A1* | 8/2010 | Hamasaki | H04L 67/125 | 710/16 |
| 2013/0332632 | A1* | 12/2013 | Rathi | H04M 1/72527 | 710/38 |
| 2014/0179229 | A1* | 6/2014 | Lin | H04W 8/005 | 455/41.2 |
| 2014/0181325 | A1* | 6/2014 | Hundal | G06F 13/126 | 710/5 |
| 2015/0050886 | A1* | 2/2015 | Donaldson | H04W 4/00 | 455/41.2 |
| 2015/0081763 | A1* | 3/2015 | Sipola | A61B 5/00 | 709/203 |
| 2015/0161591 | A1* | 6/2015 | Yang | G06Q 20/3278 | 235/379 |
| 2015/0171928 | A1* | 6/2015 | Lee | H04B 5/0031 | 455/41.1 |
| 2015/0182115 | A1* | 7/2015 | DeHennis | G06F 19/3406 | 600/316 |
| 2016/0127673 | A1* | 5/2016 | Lee | H04N 5/4403 | 348/734 |
| 2016/0132840 | A1* | 5/2016 | Bowles | G06Q 30/0278 | 705/306 |
| 2016/0150358 | A1* | 5/2016 | Ko | H04W 76/14 | 455/41.1 |
| 2016/0156376 | A1* | 6/2016 | Sashittal | G06F 13/00 | 375/219 |
| 2016/0156762 | A1* | 6/2016 | Bailey | H04M 1/72527 | 455/74.1 |
| 2016/0171219 | A1* | 6/2016 | Vaughn | G08G 1/00 | 726/26 |
| 2016/0191689 | A1* | 6/2016 | Shim | H04M 1/6091 | 455/557 |
| 2016/0242030 | A1* | 8/2016 | Pang | H04L 9/002 | |
| 2016/0294707 | A1* | 10/2016 | Chen | H04L 47/24 | |
| 2016/0320823 | A1* | 11/2016 | Gerber | G06F 1/3253 | |
| 2017/0063805 | A1* | 3/2017 | Mishra | G06F 8/654 | |
| 2017/0117719 | A1* | 4/2017 | Su | H02J 7/007 | |
| 2018/0013872 | A1* | 1/2018 | Park | H04M 1/6091 | |

* cited by examiner

BLUETOOTH PAIRING SYSTEM AND OPERATING METHOD THEREOF

BACKGROUND OF THE INVENTION

1. Field of the Invention

The present invention relates to a Bluetooth pairing system, and more particularly to a Bluetooth pairing system capable of simplifying a Bluetooth pairing process.

2. Description of the Prior Art

Nowadays, a variety of portable electronic devices are developed. For facilitating the users to carry the portable electronic devices, the designers of the portable electronic devices usually simplify some functions of the portable electronic devices or replace some existing functions of the portable electronic devices with external devices. For example, in case that a tablet computer or a smart phone is not equipped with a physical keyboard, the weight and volume are reduced. If the function of the keyboard is required, an external device is employed as a replacement.

Moreover, for increasing the user-friendliness of the portable electronic device, the external device is connected with the tablet computer or the smart phone in a wireless communication manner in replace of a wired communication manner. For example, the wireless communication between devices is a Bluetooth communication or a Wi-Fi communication. Regardless of which wireless communication protocol is used, a pairing process is needed for successfully establishing the wireless communication between the devices. Take the Bluetooth communication for example. For establishing the communication between the external keyboard and the tablet computer, the user has to previously view the use instruction to realize the device name of the external keyboard. After the Bluetooth device searching function of the tablet computer is enabled, the user can select the accurate device to connect the tablet computer with the external device.

SUMMARY OF THE INVENTION

In accordance with an aspect of the present invention, there is provided a Bluetooth pairing system. The Bluetooth pairing system includes an external device and a host device. The external device includes a Bluetooth module, a first transmission interface and a USB controller. The first transmission interface is compatible with a USB transmission format. The USB controller is connected with the Bluetooth module and the first transmission interface. The host device includes a second transmission interface and a processor. The second transmission interface is compatible with the USB transmission format. The processor is connected with the second transmission interface. When the first transmission interface is connected with the second transmission interface, a standard handshaking message complying with a USB communication protocol is issued from the processor to the external device through the second transmission interface and the first transmission interface. After the standard handshaking message is received by the USB controller of the external device, a device descriptor of the external device is transmitted from the USB controller to the host device. The device descriptor contains a vendor identification code (VID), a product identification code (PID), a product string and a product type of the external device and a target communication address of the Bluetooth module.

In accordance with another aspect of the present invention, there is provided an operating method of a Bluetooth pairing system. The Bluetooth pairing system includes an external device and a host device. The external device includes a Bluetooth module and a USB controller. The operating method includes the following steps. Firstly, the external device is connected with the host device. Consequently, a standard handshaking message complying with a USB communication protocol is issued from the host device to the external device. Then, a device descriptor of the external device is transmitted from the USB controller to the host device after the standard handshaking message is received by the USB controller of the external device. The device descriptor contains a vendor identification code (VID), a product identification code (PID), a product string and a product type of the external device and a target communication address of the Bluetooth module. Then, the host device analyzes the device descriptor to acquire the target communication address of the Bluetooth module.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
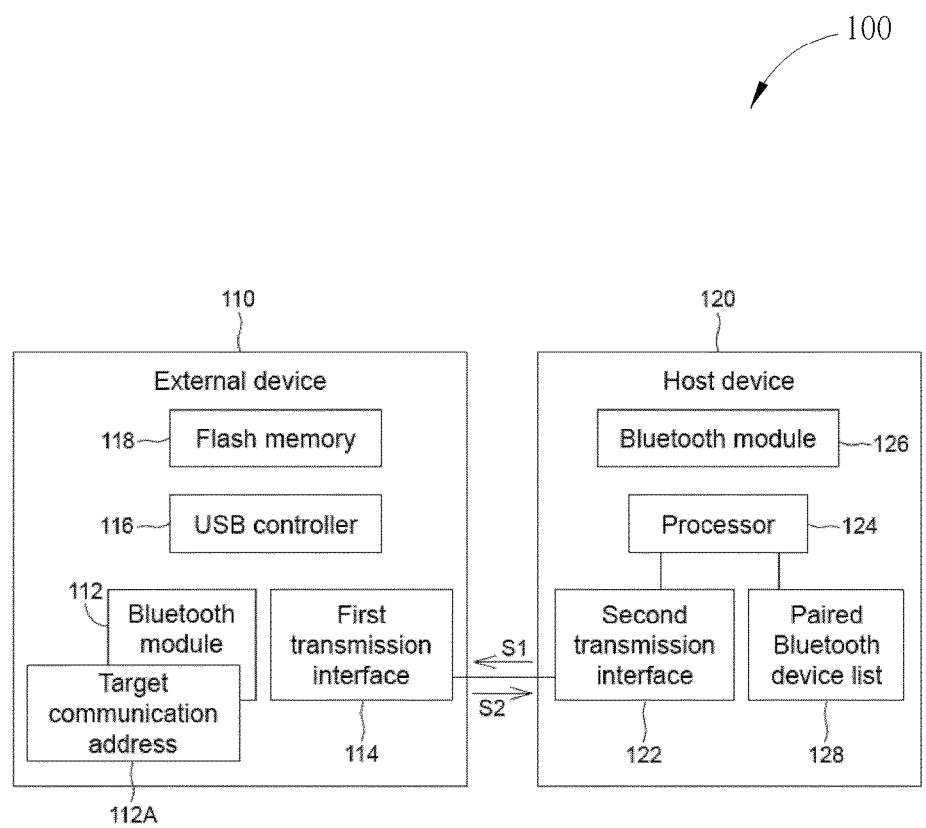
FIG. 1 is a schematic functional block diagram illustrating a Bluetooth pairing system according to an embodiment of the present invention.

FIG. 1 is a schematic functional block diagram illustrating a Bluetooth pairing system according to an embodiment of the present invention. As shown in FIG. 1, the Bluetooth pairing system 100 comprises an external device 110 and a host device 120. An example of the host device 120 includes but is not limited to a computer, a notebook computer, a mobile phone, a tablet computer or any other device with the general computing function. An example of the external device 110 includes but is not limited to a keyboard, a handwriting board, a camera or any other device with specified application functions.

The external device 110 comprises a Bluetooth module 112, a first transmission interface 114 and a universal serial bus (USB) controller 116. The first transmission interface 114 is compatible with the USB transmission format. The USB controller 116 is connected with the Bluetooth module 112 and the first transmission interface 114.

The host device 120 comprises a second transmission interface 122, a processor 124 and a Bluetooth module 126. The second transmission interface 122 is compatible with the USB transmission format. The processor 124 is connected with the second transmission interface 122, and the Bluetooth module 126. In an embodiment, the first transmission interface 114 and the second transmission interface 122 are a set of single pogo pin connectors that match each other. In another embodiment, the first transmission interface 114 and the second transmission interface 122 are standard USB interfaces that match each other.

When the first transmission interface 114 is connected with the second transmission interface 122, a standard handshaking message S1 complying with the USB communication protocol is issued from the processor 124 of the host device 120 to the external device 110 through the second transmission interface 122 and the first transmission interface 114.

After the standard handshaking message S1 is received by the USB controller 116 of the external device 110, a device descriptor S2 of the external device 110 is transmitted from the USB controller 116 to the host device 120. The device descriptor S2 is a device information according to the USB communication protocol. Generally, the device descriptor S2 is used for describing the basic information of the device that is connected through the universal serial bus. In an embodiment, the device descriptor S2 contains a vendor identification code (VID), a product identification code (PID), a product string and a product type of the external device 110 and a target communication address 112A (or some communication addresses) of the Bluetooth module 112.

When the host device 120 acquires the device descriptor S2 according to the USB communication protocol, the host device 120 also acquires the target communication address 112A of the Bluetooth module 112. Meanwhile, the host device 120 further judges whether the external device 110 and the host device 120 have been paired with each other. According to the result of judging whether the external device 110 and the host device 120 have been paired with each other, the host device 120 determines whether the paring process is automatically performed or not.

In an embodiment, the host device 120 further comprises a paired Bluetooth device list 128. The paired Bluetooth device list 128 records the Bluetooth communication addresses of the Bluetooth devices that have been paired with the host device 120. After the processor analyzes the device descriptor S2 and acquires the target communication address 112A of the Bluetooth module 112, the processor 124 compares the target communication address 112A of the Bluetooth module 112 with the paired Bluetooth device list 128. According to the comparing result, the processor 124 realizes whether the target communication address 112A is present in the paired Bluetooth device list 128.

If the target communication address 112A is not present in the paired Bluetooth device list 128, it means that the external device 110 and the host device 120 have not been paired with each other. Then, the host device 120 performs a Bluetooth device searching operation. At the same time, the host device 120 issues a command to the external device 110 through the second transmission interface 122 and the first transmission interface 114. In response to the command, the external device 110 enters a Bluetooth connection mode. Then, the processor 124 performs a Bluetooth communication pairing operation to pair with the external device 110 through the Bluetooth module 126 according to the target communication address 112A. In other words, it is not necessary to manually set the pairing parameters.

As known, some external devices with the same brand and the same model number may have the identical Bluetooth communication address. Consequently, while the host device 120 performs a Bluetooth device searching operation, the number of the searched Bluetooth devices with the target communication address 112A is possibly larger than 1. Meanwhile, a menu containing the information of the searched available Bluetooth devices is shown on the host device 120. Through the menu, the user can select the corresponding external device from the searched available Bluetooth devices.

If the external device 110 and the host device 120 have been paired with each other, the external device 110 and the host device 120 can be connected with each other automatically when the Bluetooth communication functions of the external device 110 and the host device 120 are enabled. Under this circumstance, the host device 120 does not need to enter the Bluetooth connection mode by connecting the first transmission interface 114 with the second transmission interface 122. That is, the timing of allowing the host device 120 to enter the Bluetooth connection mode may be determined by the user.

In an embodiment, the USB controller 116 acquires the target communication address 112A of the Bluetooth module 112 and records the target communication address 112A in the device descriptor S2 of the external device 110 when the external device 110 is powered on. In some embodiments, for assuring the host device 120 of acquiring the target communication address 112A from the device descriptor S2, the target communication address 112A is recorded in a specified field of the device descriptor S2 by the USB controller 116. For example, the specified field is a reserved field that is preset according to the USB communication protocol. When the processor 124 analyzes the specified field of the device descriptor S2, the information recorded in the specified field is correlated with the target communication address 112A.

As mentioned above, the USB controller 116 records the target communication address 112A in the device descriptor S2 when the external device 110 is powered on. If the device descriptor S2 is updated by the USB controller 116 whenever the external device 110 is powered on, the updating process increases the system burden or wastes time. For solving this drawback, the external device 110 is further equipped with a non-volatile memory 118. Moreover, a Bluetooth communication address is stored in the non-volatile memory 118. If the Bluetooth communication address in the non-volatile memory 118 is different from the target communication address 112A, the USB controller 116 records the target communication address 112A in the device descriptor S2 of the external device 110 and stores the target communication address 112A in the non-volatile memory 118. If the target communication address 112A of the Bluetooth module 112 is not changed when the external device 110 is powered on at the next time, the Bluetooth communication address in the non-volatile memory 118 is identical to the target communication address 112A. Under this circumstance, the USB controller 116 does not need to update the device descriptor S2.

As mentioned above, the USB controller 116 records the target communication address 112A of the Bluetooth module 112 in the device descriptor S2 of the external device 110. Consequently, when the host device 120 and the external device 110 perform the handshaking operation, the target communication address 112A is directly transmitted from the external device 110 to the host device 120. Consequently, the host device 120 directly performs the pairing process without the manual settings. Moreover, since the target communication address 112A of the Bluetooth module 112 is transmitted from the external device 110 during the standard communication process of the universal serial bus, the transmitting process is simplified and the extent of modifying the hardware and software is largely reduced.

Figure 2:
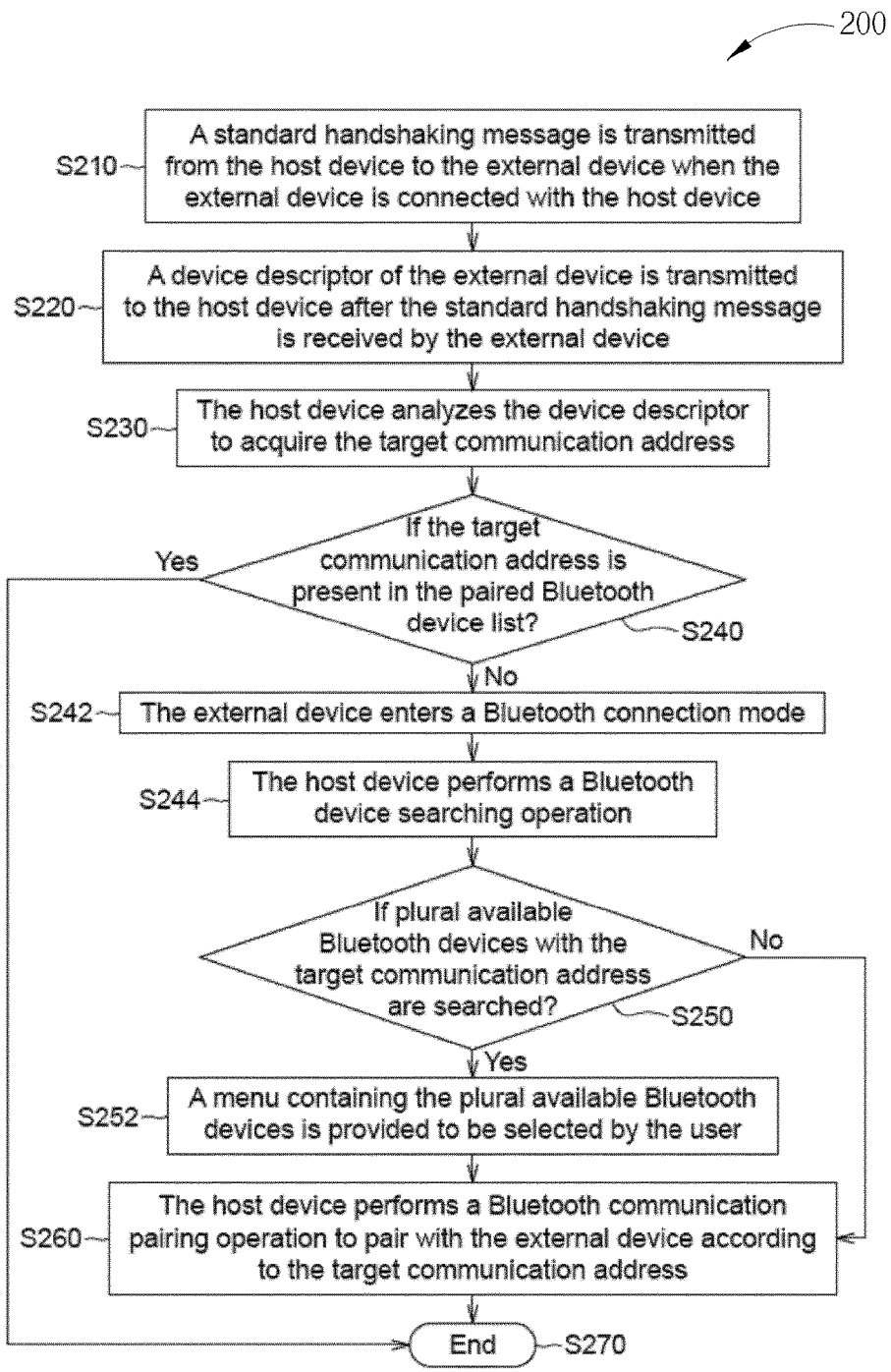
FIG. 2 is a flowchart illustrating the steps S210-S270 of an operating method of the Bluetooth pairing system according to an embodiment of the present invention.

FIG. 2 is a flowchart illustrating an operating method of the Bluetooth pairing system according to an embodiment of the present invention. The operating method 200 as shown in FIG. 2 comprises the following steps S210-S270. It is noted that the sequence of the steps S210-S270 is not restricted.

In the step S210, a standard handshaking message S1 complying with the USB communication protocol is transmitted from the host device 120 to the external device 110 when the external device 110 is connected with the host device 120.

In the step S220, a device descriptor S2 of the external device 110 is transmitted from the USB controller 116 to the host device 120 after the standard handshaking message S1 is received by the USB controller 116 of the external device 110.

In the step S230, the host device 120 analyzes the device descriptor S2 to acquire the target communication address 112A of the Bluetooth module 112.

In the step S240, the host device 120 judges whether the target communication address 112A is present in the paired Bluetooth device list 128. If the judging condition of the step S240 is satisfied, the step S270 is performed. Whereas, if the judging condition of the step S240 is not satisfied, the step S242 is performed.

In the step S242, the external device 110 enters a Bluetooth connection mode under control of the host device 120.

In the step S244, the host device 120 performs a Bluetooth device searching operation.

In the step S250, the host device 120 judges whether plural available Bluetooth devices with the target communication address 122A are searched while the Bluetooth device searching operation is performed. If the judging condition of the step S250 is satisfied, the step S252 is performed. Whereas, if the judging condition of the step S250 is not satisfied, the step S260 is performed.

In the step S252, a menu containing the plural available Bluetooth devices is provided to be selected by the user.

In the step S260, the host device 120 performs a Bluetooth communication pairing operation to pair with the external device 110 according to the target communication address 112A.

In the step S270, the flowchart is ended.

Figure 3:
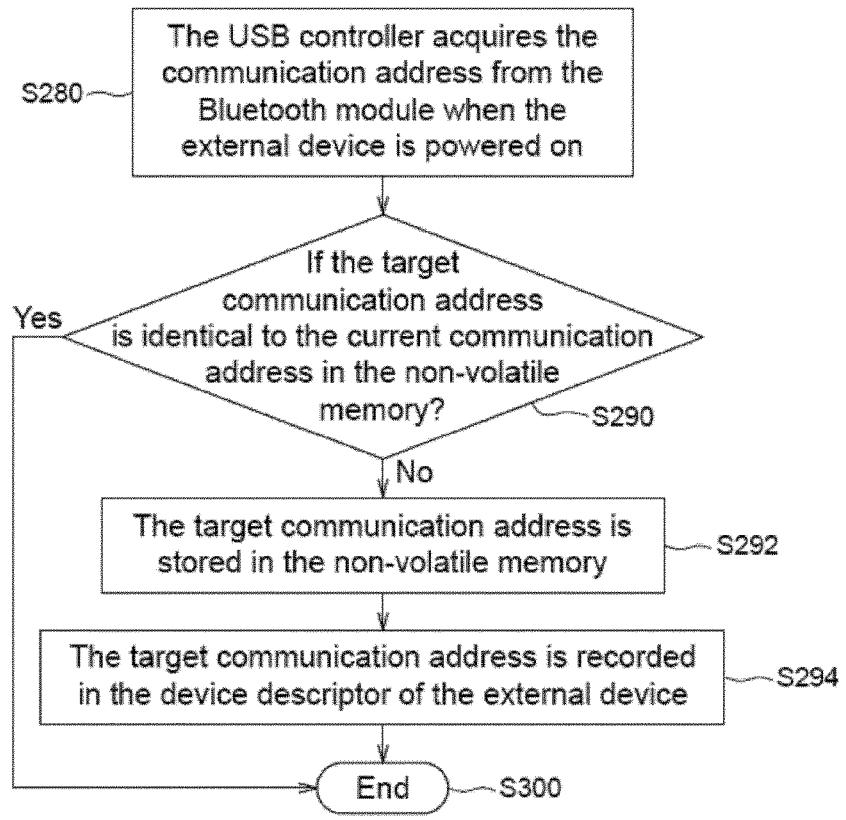
FIG. 3 is a flowchart illustrating the steps S280-S300 of an operating method of the Bluetooth pairing system according to an embodiment of the present invention.

If the device descriptor S2 is updated by the USB controller 116 whenever the external device 110 is powered on, the updating process increases the system burden or wastes time. For solving this drawback, the operating method 200 of the Bluetooth pairing system 100 further comprises the steps S280-S300 before the step S220 of transmitting the device descriptor S2 to the host device 120. The flowchart of the steps S280-S300 of the operating method 200 is shown in FIG. 3. That is, the steps S210-S270 are performed after the steps S280-S300.

In the step S280, the USB controller 116 acquires the communication address 112A from the Bluetooth module 112 when the external device 110 is powered on.

In the step S290, the host device 120 judges whether the target communication address 112A is identical to the current communication address in the non-volatile memory 118. If the judging condition of the step S290 is satisfied, the step S300 is performed. Whereas, if the judging condition of the step S290 is not satisfied, the step S292 is performed In the step S292, the target communication address 112A is stored in the non-volatile memory 118.

In the step S294, the target communication address 112A is recorded in the device descriptor S2 of the external device 110.

In the step S300, the flowchart is ended.

In the steps S280-S300 of the operating method 200, the USB controller 116 records the target communication address 112A of the Bluetooth module 112 in the device descriptor S2. In the steps S210 and S220, the target communication address 112A is directly transmitted from the external device 110 to the host device 120 when the host device 120 and the external device 110 perform the handshaking operation. Consequently, the host device 120 directly performs the Bluetooth pairing process without the manual settings. Moreover, since the target communication address 112A of the Bluetooth module 112 is transmitted from the external device 110 during the standard communication process of the universal serial bus, the transmitting process is simplified and the extent of modifying the hardware and software is largely reduced.

From the above descriptions, the present invention provides a Bluetooth pairing system and an operating method of the Bluetooth pairing system. The Bluetooth communication address of the external device is stored in the device descriptor according to the USB communication protocol. During the handshaking operation of the universal serial bus, the host device can directly acquire the Bluetooth communication address of the external device and directly perform the pairing process without manual settings. Consequently, the Bluetooth pairing process is simplified, and the extent of modifying the hardware and software is largely reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A Bluetooth pairing system, comprising: an external device comprising a Bluetooth module, a first transmission interface, a USB controller and a non-volatile memory, wherein the first transmission interface is compatible with a USB transmission format, and the USB controller is connected with the Bluetooth module and the first transmission interface; and a host device comprising a second transmission interface and a processor, wherein the second transmission interface is compatible with the USB transmission format, and the processor is connected with the second transmission interface, wherein when the first transmission interface is connected with the second transmission interface, a standard handshaking message complying with a USB communication protocol is issued from the processor to the external device through the second transmission interface and the first transmission interface, wherein after the standard handshaking message is received by the USB controller of the external device, a device descriptor of the external device is transmitted from the USB controller to the host device to complete a handshaking operation, wherein the device descriptor contains a vendor identification code (VID), a product identification code (PID), a product string and a product type of the external device and a target communication address of the Bluetooth module; wherein when the external device is powered on, the USB controller acquires the target communication address from the Bluetooth module; and when the target communication address is different from a Bluetooth communication address in the non-volatile memory, the USB controller stores the target communication address in the non-volatile memory and records the target communication address in the device descriptor of the external device.

2. The Bluetooth pairing system according to claim 1, wherein:

the host device further comprises a paired Bluetooth device list, and the paired Bluetooth device list records Bluetooth communication addresses of Bluetooth devices that have been paired with the host device;

after the processor analyzes the device descriptor and acquires the target communication address of the Bluetooth module, the processor judges whether the target communication address is present in the paired Bluetooth device list; and if the target communication address is not present in the paired Bluetooth device list, the processor performs a Bluetooth device searching operation, so that the external device enters a Bluetooth connection mode.

3. The Bluetooth pairing system according to claim 2, wherein if plural available Bluetooth devices with the target communication address are searched while the Bluetooth device searching operation is performed, a menu containing the plural available Bluetooth devices is provided by the host device, and the external device is selected from the plural available Bluetooth devices by a user through the menu.

4. The Bluetooth pairing system according to claim 1, wherein the processor further performs a Bluetooth communication pairing operation to pair with the external device according to the target communication address.

5. The Bluetooth pairing system according to claim 1, wherein the first transmission interface and the second transmission interface are a set of single pogo pin connectors that match each other.

6. An operating method of a Bluetooth pairing system, the Bluetooth pairing system comprising an external device and a host device, the external device comprising a Bluetooth module, a USB controller, and a non-volatile memory, the operating method comprising steps of: connecting the external device with the host device, so that a standard handshaking message complying with a USB communication protocol is issued from the host device to the external device; transmitting a device descriptor of the external device from the USB controller to the host device to complete a handshaking operation after the standard handshaking message is received by the USB controller of the external device, wherein the device descriptor contains a vendor identification code (VID), a product identification code (PID), a product string and a product type of the external device and a target communication address of the Bluetooth module; the host device analyzing the device descriptor to acquire the target communication address of the Bluetooth module; when the external device is powered on, the USB controller acquiring the target communication address from the Bluetooth module; and when the target communication address is different from a current communication address in the non-volatile memory, the USB controller storing the target communication address in the non-volatile memory and recording the target communication address in the device descriptor of the external device.

7. The operating method according to claim 6, wherein:

the host device further comprises a paired Bluetooth device list, and the paired Bluetooth device list records Bluetooth communication addresses of Bluetooth devices that have been paired with the host device; and if the host device judges that the target communication address is not present in the paired Bluetooth device list, the host device allows the external device to enter a Bluetooth connection mode, and the external device performs a Bluetooth device searching operation.

8. The operating method according to claim 7, wherein if plural available Bluetooth devices with the target communication address are searched while the Bluetooth device searching operation is performed, a menu containing the plural available Bluetooth devices is provided and the external device is selected from the plural available Bluetooth devices by a user through the menu.

9. The operating method according to claim 6, further comprising a step of performing a Bluetooth communication pairing operation to pair with the external device according to the target communication address.

* * * * *